Aug. 11, 1942.  F. LOHSE  2,292,705
FLIGHT CONTROL SYSTEM FOR MINIATURE AIRCRAFT
Filed July 10, 1941
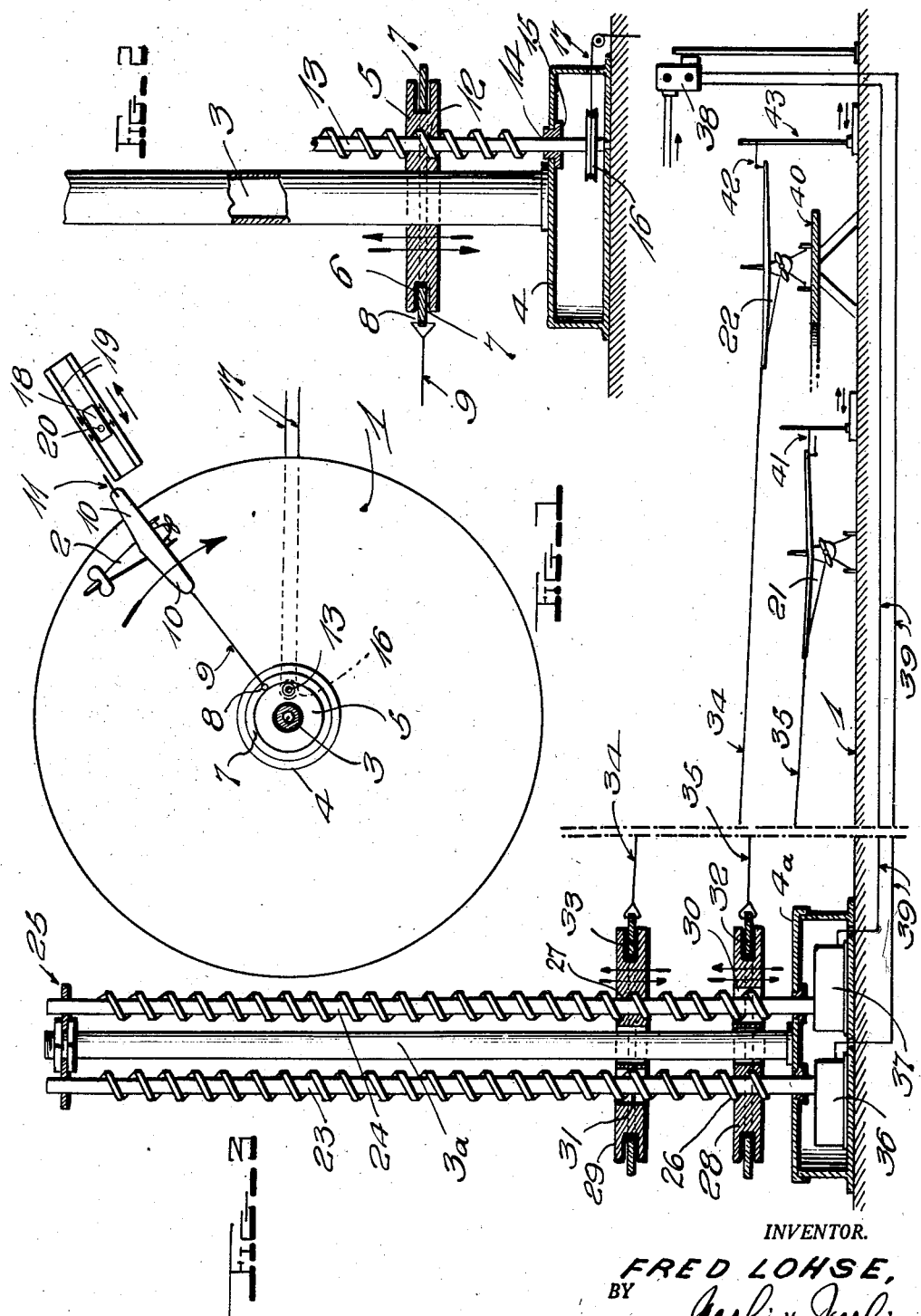
INVENTOR.
FRED LOHSE,
BY
*Jacobi & Jacobi*
ATTORNEYS Patented Aug. 11, 1942

2,292,705

UNITED STATES PATENT OFFICE 2,292,705

FLIGHT CONTROL SYSTEM FOR MINIATURE AIRCRAFT

Fred Lohse, Cupertino, Calif.

Application July 10, 1941, Serial No. 401,842

7 Claims. (Cl. 272—31)

This invention relates to a flight control system for miniature aircraft and it is one object of the invention to provide a system of this character wherein one or more miniature aircraft may be operated in predetermined path in order to ascertain and test their performance in flight, this being either for amusement or for scientific testing of miniature planes built as scale models of newly developed types of planes which it is proposed to adopt for commercial or military use if the models successfully pass tests to which they are subjected.

Another object of the invention is to provide an apparatus by means of which the model planes may be caused to take off, then travel in an endless path, and finally landed upon the surface from which they took off and come to a stop under approximately normal conditions.

Another object of the invention is to provide an apparatus so constructed that the altitude attained by the aircraft in flight may be controlled and the aircraft caused to make a landing through shutting off of its motor by engagement of a control lever for the motor with an abutment operated by an attendant having charge of the apparatus.

Another object of the invention is to provide an apparatus wherein a number of miniature aircraft may be operated at the same time in simulation of a race or as an actual test of comparative speed, the arrangement being such that the aircraft will not interfere with each other and also permitting one aircraft to make a landing without interfering with another aircraft in flight.

Another object of the invention is to provide an apparatus of this character which is simple in construction, easy to operate and very entertaining to spectators as well as instructive when used for scientific tests of scale models of aircraft.

Another object of the invention is to provide an apparatus which may be used for advertising purposes or for playing games of chance wherein the aircraft has its motor shut off while flying over a circular path divided into sections upon one of which the aircraft stops after landing.

Still another object of the invention resides in providing a device which is simple and durable in construction, inexpensive to manufacture and one which will be very efficient in operation and application to use.

With these and numerous other objects in view, my invention consists in the novel features of construction, combination and arrangement of parts as will be hereinafter referred to and more particularly pointed out in the specification and claims.

The invention is illustrated in the accompanying drawing wherein:

Figure 1 is a diagrammatic view in top plan of the improved apparatus;

Figure 2 is a view showing a portion of the apparatus in vertical section, the apparatus illustrated being for operating one aircraft; and Figure 3 is a view similar to Figure 2 of an apparatus for operating two aircrafts.

Engine powered miniature aircraft are usually flown above a large field or airport. The procedure is to set the rudder of the airplane so that it will fly in a circle, to start the motor and set the flight timer, to let the plane take off and gain elevation until the flight timer stops the engine, and then to retrieve the airplane after it has glided down to a landing somewhere on the field. Almost all of the action takes place hundreds of feet from the operator of the airplane and from interested spectators. Because of this distance the performance is not as spectacular as it would be if the airplane performed within, say, five to fifty feet of the observer.

My invention makes it possible to let a miniature engine powered airplane take off directly before the spectator, to keep it flying in a closed path such as a circle, to increase and decrease its altitude at will, and to land the plane directly before the spectator whenever the operator wishes to do so. Complete control of altitude is achieved in a simple and positive manner. The miniature airplane is flown within a short distance of the spectator, and its landing can be easily and positively controlled. Exact-scale models, which are not successful flyers as a rule, can be flown with confidence by this method. Proportionally-powered exact-scale models can be flown to demonstrate differences in performance as they actually obtain in the original airplanes modeled. Multi-motored scale models can be successfully flown by this method, whereas such models are not usually successful flyers when flown in the customary way. Scale-models of seaplanes and flying boats can also be flown by this method, using water for the landing surface. Miniature airplanes can be flown indoors by this method, making engine-powered model flying independent of weather conditions. Several airplanes may be flown simultaneously in closed paths by means of a certain form of the combination which comprises my invention.

In the accompanying drawing, the numeral 1 indicates a field or surface representing or actually constituting a portion of a flying field over which a miniature aircraft 2 is to be flown for testing purposes or for educational or amusement purposes, it being also understood that the apparatus may constitute an advertising device displayed in a show window or the like to attract attention to a store or a particular product. A standard 3 is mounted vertically at the center of the field or surface 1 and while the standard is preferably of tubular formation, as shown in Figure 2, it is to be understood that it may be solid. At its lower end the standard is mounted upon a hollow base 4 of sufficient dimensions to support the standard upright when fixed to the field or surface 1 or merely resting thereon. It will be understood that a portion of the base may be embedded in the ground of an outdoor field.

About the standard 3 is mounted a disc or collar 5 which may be formed of any suitable material and fits loosely about the standard so that it may be shifted vertically to adjusted positions. This collar is formed with a circumferentially extending groove 6 in its marginal edge face and in this groove is seated a ring 7 formed at one point about its circumference with an opening 8 so that a line or flexible mounting member 9 may be tied through the opening and connect the inner end of the line with the ring. The line 9 may be formed of cord, wire, chains or other suitable material and is of such length that the miniature aircraft at the outer end of this line will be disposed over the flying field or surface 1. In the present illustration the aircraft is in the form of an airplane having wings 10 projecting from opposite sides of its fuselage, the line 9 being tied through the tip of the wing projecting from the inner side of the fuselage, but it is to be understood that any other type of aircraft may be substituted in place of the airplane. This aircraft will be equipped with a motor for driving the same and there will also be suitable control means for the motor, including an actuating lever 11 carried by the outer wing and projecting longitudinally of this wing from the outer end or tip thereof.

During operation of the apparatus it is desired to have the aircraft attain a predetermined altitude. In order to do so the disc or collar 5 is formed with a threaded opening 12 through which passes a threaded shaft 13. This shaft 13 extends vertically in spaced parallel relation to the standard 3 at one side thereof. Referring in particular to Figure 2 it will be seen that the lower end portion of the threaded shaft is rotatably mounted through an opening 14 formed in the top wall of the base 4, the lower end of the thread for this shaft having engagement with the upper face of the top wall and an abutment flange 15 having engagement with the under face of the top wall of the base. The lower end of the threaded shaft extends downwardly into the base and carries a drum 16 about which is trained a belt or cable 17. This belt or cable 17 extends radially of the landing field or surface 1 in countersunk relation thereto where it will be out of the way and properly passes through a tube or pipe which extends from the base to a point beyond the marginal edge of the landing field.

When the shaft is turned in one direction, the disc or collar 5 will be shifted upwardly along the standard to a desired height which will allow the aircraft to attain a predetermined altitude while in flight and when the shaft is turned in an opposite direction, the aircraft will be caused to lose altitude until it reaches a position close to the flying field or surface 1.

After the aircraft has been brought downwardly to a point where it can glide to a landing, the power unit or motor for the aircraft is to be shut off. In order to do so, there has been provided an abutment which is movable radially of the landing field into and out of position for engagement by the lever 11 and thus cause the lever to be moved in a direction to shut off the motor. In the present illustration, this abutment consists of a carriage 18 mounted for movement along a supporting track or rail 19. The track or rail 19 extends radially of the landing field outwardly thereof from the marginal edge of the field and the carriage may be shifted along this track either by hand or automatically in any desired manner. A pin 20 extends upwardly from the carriage and it will be readily understood that when the carriage is in the position shown in Figure 1, the aircraft may fly in an endless path about the standard, whereas when the carriage is moved toward the inner end of the track to a position close to the marginal edge of the flying field, the lever 11 of a low flying aircraft will strike the upstanding abutment pin 20 and thus will cause the lever to be moved in a direction to shut off the motor. Thus aircraft will then glide to a landing upon the field or surface 1 and come to a stop. If a hydroplane is being used in place of a land plane, the standard will be mounted at the center of a tank of suitable dimensions and the aircraft will land upon the surface of the water. It will also be obvious that the apparatus may be employed as a game apparatus in which case the surface 1 may be divided into radially extending sections and the sections will be suitably marked for identification purposes or for scoring values. In such a device, the scoring value or identifying marks of the section upon which the wheels rest when the aircraft comes to a stop will be noted by the players.

In Figure 3 there has been shown an embodiment of the invention wherein two airplanes or equivalent aircraft 21 and 22 are to be simultaneously flown. The base 4ᵃ of the standard 3ᵃ is of somewhat larger dimensions than the base 4 and there have been provided two threaded shafts 23 and 24 spaced from the standard and having their upper ends journalled through a bearing plate 25 carried by the upper end of the standard and their lower ends rotatably mounted through openings formed in the top wall of the base. These adjusting shafts 23 and 24 pass through threaded openings 26 and 27 formed in the discs or collars 28 and 29 which correspond to the collar 5 and are shiftable vertically along the standard. The shafts 23 and 24 also pass freely through unthreaded openings 30 and 31 formed in the collars and it will be readily seen that when either of the threaded shafts is rotated, the collar with which it has threaded engagement will be shifted vertically but the other collar will remain stationary. Rings 32 and 33, corresponding to the ring 8, are rotatably carried by the collars 28 and 29 and the airplanes 21 and 22 are connected with the rings 32 and 33 by lines or flexible mounting members 35 and 34 having their inner ends tied or otherwise secured to the rings and their outer ends tied to the tips of the airplane wings. The two lines are of such length that the airplane 22 operates outwardly of the aircraft 21 and when these airplanes are in flight the inner airplane 21 may fly in a circular path about the standard but it must fly at such an altitude that it may pass under the line 34 of the outer airplane.

While the threaded shafts 23 and 24 may be rotated through the medium of cables or belts trained about drums at their lower ends, these shafts have been shown with their lower ends extending into housings 36 and 37 where they will have geared connections with suitable motors controlled from a switch box 38. This switch box has suitable switches therein which are individually connected with the motors by conductors 39. Therefore, the motors may be individually operated and the altitude attained by the two airplanes individually controlled. The airplane 21 lands directly upon the landing field or surface 1 but the airplane 22 lands upon a raised surface 40 extending in a circular path about the surface 1. This surface 40 is at such a height that there will be no interference between the two airplanes when a landing is made. Actuating levers 41 and 42 for controlling the motors of the two airplanes project outwardly from their wings and abutment means which are similar to the abutment means for engagement by the lever 11 are provided for engagement by these levers. These abutment members, which are indicated in general by the numeral 43, are slidably mounted for movement radially of the landing field and the path 40 and when they are shifted inwardly to an operative position, they will engage the levers 41 and 42 and cause the motors to be shut off. The airplanes will then fly to a landing. It will thus be seen that two airplanes may be simultaneously flown for comparative tests. While only two airplanes have been shown in Figure 3, it will be obvious that additional airplanes and companion landing surfaces could be provided and each airplane connected with the ring of a collar loosely mounted about the standard and controlled by a threaded shaft which passes freely through all of the other collars.

From the foregoing description of the construction of my flight control system for miniature aircraft, the operation thereof will be readily understood. It will be seen that I have provided a simple, inexpensive and efficient means for carrying out the objects of the invention, and while I have particularly described the elements best adapted to perform the functions set forth, it is obvious that various changes in form, proportion and in the minor details of construction may be resorted to, without departing from the spirit or sacrificing any of the principles of the invention.

Having thus described the invention, what is claimed is:

1. In an apparatus of the character described, a vertical standard, a miniature aircraft, a mounting member connected with a wing at one side of the aircraft and mounting the aircraft for movement in an endless path about the standard, a control for a power unit of the aircraft extending from the wing at the other side of the aircraft, and means movable into and out of position for engagement by the control to actuate the control and shut off the driving unit while the aircraft is in flight and cause the aircraft to land upon a surface over which it moves while in flight.

2. In an apparatus of the character described, a vertical standard, a miniature aircraft having a fuselage and wings projecting from opposite sides thereof, a collar about the standard shiftable vertically thereon, a ring rotatable about the collar, a line connecting said ring with the tip of one wing of the aircraft to mount the aircraft for movement in an endless path about the standard, a control for a motor for the aircraft extending outwardly from the tip of the other wing of the aircraft, means for shifting the collar vertically along the standard to control altitude of the aircraft, and manually operated means movable into and out of position for engagement by the control to actuate the same and cause shutting off of the motor and consequent landing of the aircraft.

3. In an apparatus of the character described, a vertical standard, a collar fitting loosely about the standard, an adjusting shaft rotatably mounted and extending longitudinally of the standard in parallel spaced relation thereto, the shaft being threaded through said collar, means for turning the shaft to shift the collar vertically along the standard and support the collar in a vertically adjusted position, a ring rotatable about the collar, a miniature aircraft having wings projecting from its opposite sides, a line connecting the tip of one wing with said ring and causing the aircraft to move in an endless path about the standard when in flight, the aircraft having a motor and means for controlling operation of the motor including a lever mounted at the outer end of the other wing and projecting outwardly therefrom, and an abutment movable into and out of position for engagement by the lever to actuate the lever and render the motor inoperative while the aircraft is in flight and thereby cause the aircraft to make a landing upon a field surrounding the standard.

4. In an apparatus of the character described, a vertical standard, a base for the standard, a collar fitting loosely about the standard and formed with a threaded opening, a ring rotatable about the collar, a threaded shaft extending vertically and having its lower end rotatably supported by the base, said shaft being threaded through the threaded opening of the collar and when turned serving to vertically adjust the collar along the standard and support the collar in a vertically adjusted position, means for rotating the shaft to adjust the position of the collar, an aircraft, a line connecting the aircraft with said ring and mounting the aircraft for movement in an endless path about the collar when in flight, and means to shut off the driving motor of the aircraft in flight and thus cause the aircraft to glide to a landing.

5. In an apparatus of the character described, a vertical standard, a base for the standard, collars fitting loosely about the standard one above another and shiftable vertically along the standard, threaded shafts rotatably mounted in parallel spaced relation to the standard and threaded through the collars, means to individually rotate the shafts and individually shift the collars vertically to adjusted positions, concentric landing surfaces surrounding the standard, aircrafts movable along the said surfaces when grounded, lines connecting the aircraft with the rings of companion collars, and causing the aircrafts to move in endless paths about the standard when in flight, and means for selectively and individually shutting off motors of the aircrafts while in flight and causing the aircrafts to land upon the landing surfaces.

6. In an apparatus of the character described, a miniature aircraft, a vertical standard, a collar about the standard shiftable vertically thereon, a ring rotatable about the said collar, a mounting member connected to said ring and to a wing of said aircraft for mounting said aircraft for movement in an endless path about the standard, and means for rendering a driving unit for the aircraft inoperative while the aircraft is in flight and thereby causing the aircraft to come to a landing upon a surface over which the aircraft moves while in flight.

7. In an apparatus of the character described, a miniature self-propelled aircraft, a vertical standard, a collar about the standard shiftable vertically thereon, a ring rotatable about said collar, a flexible member connected to said ring and to said aircraft for mounting said aircraft for movement in an endless path about the standard, and means for rendering the driving unit for the aircraft inoperative while the aircraft is in flight and thereby causing the aircraft to come to a landing upon a surface over which the aircraft moves while in flight.

FRED LOHSE.